July 2, 1929.  A. LOWY  1,719,185

PROCESS FOR DISINFECTING AND APPARATUS THEREFOR

Filed Aug. 6, 1926

INVENTOR
Alexander Lowy
BY
J. P. Bassecches
ATTORNEY

Patented July 2, 1929.

1,719,185

UNITED STATES PATENT OFFICE.

ALEXANDER LOWY, OF PITTSBURGH, PENNSYLVANIA.

PROCESS FOR DISINFECTING AND APPARATUS THEREFOR.

Application filed August 6, 1926. Serial No. 127,632.

This invention relates to a process of disinfecting garbage and apparatus therefor.

My invention relates generally to a process of disseminating a disinfectant or deodorant for the treatment of garbage to prevent the attraction of flies and the formation or accumulation of maggots, roaches and other undesirable bugs and insects around waste products, such as garbage, and coordinately resides in the provision of apparatus therefor.

More particularly, my invention resides in a process for disseminating a normally solid disinfectant or deodorant in vaporous form for the treatment of waste products, such as garbage, and other decomposable matter usually attracting roaches, bugs, flies, maggots, and other insects breeding disease. Still more particularly, my invention resides in disseminating a normally solid disinfectant and deodorant and changing it to the vapor state and coordinately resides in a process to facilitate the more complete dissemination of a normally solid disinfectant in vaporous condition so that it may be used for treating waste materials, such as garbage and the like, and further resides in the provision of apparatus to disseminate a deodorant and disinfectant in the vaporous condition.

Still more particularly, my invention has for an object thereof the provision of a process for disseminating a normally solid deodorant and disinfectant to present it in a vaporous condition for the treatment of garbage and other waste materials; still more particularly, a deodorant and disinfectant, such as paradichlorbenzene.

My invention is premised on the discovery that a normally solid disinfectant, such as paradichlorbenzene, can be used effectively in a vaporous form and that it can be disseminated in this condition to better advantage if a carrier therefor is provided comprising water vapor and that when the normally solid disinfectant, such as paradichlorbenzene is submitted to currents containing water vapor, a portion of disinfectant in a vaporous form will be suspended in the carrier and be intermingled therewith to be effective in the treatment of waste products, such as garbage, to deodorize the same and prevent the accumulation of flies, roaches, larvæ, maggots, and other insects so that the garbage may be stored for a considerable length of time at any ordinary temperature without becoming offensive or injurious to the health.

My invention still further, therefore, has for an object thereof the provision of apparatus for disseminating a normally solid disinfectant and deodorant, such as paradichlorbenzene, by providing means to circulate a highly water saturated current of air about a normally solid disinfectant, such as paradichlorbenzene, to induce the more rapid vaporization of the disinfectant and more thoroughly disseminate the gaseous agent surrounding garbage or the like, and thereby more effectively perform the function of deodorizing and disinfecting.

In the preferred embodiment, my invention has for an object thereof the provision of a garbage receptacle including means to circulate a normally solid disinfectant, such as paradichlorbenzene, so as to facilitate dissemination in the vaporous condition of a disinfectant or deodorant. In the specific embodiment of my invention, means are provided to circulate the air, preferably containing water vapor, about or through a normally solid deodorant and disinfectant, such as paradichlorbenzene, to more thoroughly disseminate the vapors of such disinfectant in the air surrounding a receptacle containing waste material, such as garbage, and includes a vibratory member containing a normally solid disinfectant capable of vaporizing in the air, such as paradichlorbenzene, and means to ensure a thorough circulation of air about a container for a disinfectant and deodorant, such as paradichlorbenzene, the apparatus being adapted not only to disseminate the disinfectant in the vaporous condition but also to scatter small quantities of the solid disinfecting material directly to the waste material, such as garbage, and thereby insure effective deodorization and disinfecting of the waste products against obtaining an offensive odor or accumulation of larvæ, insects or bacteria injurious to the health.

To attain these objects and such further objects as may appear herein or be hereinafter pointed out, and for the purpose of illustrating the practice of the novel process herein involved, I make reference to the accompanying drawing forming a part hereof in which Figure 1 is a sectional view of a side elevation of a preferred form of my device;

Figure 1:
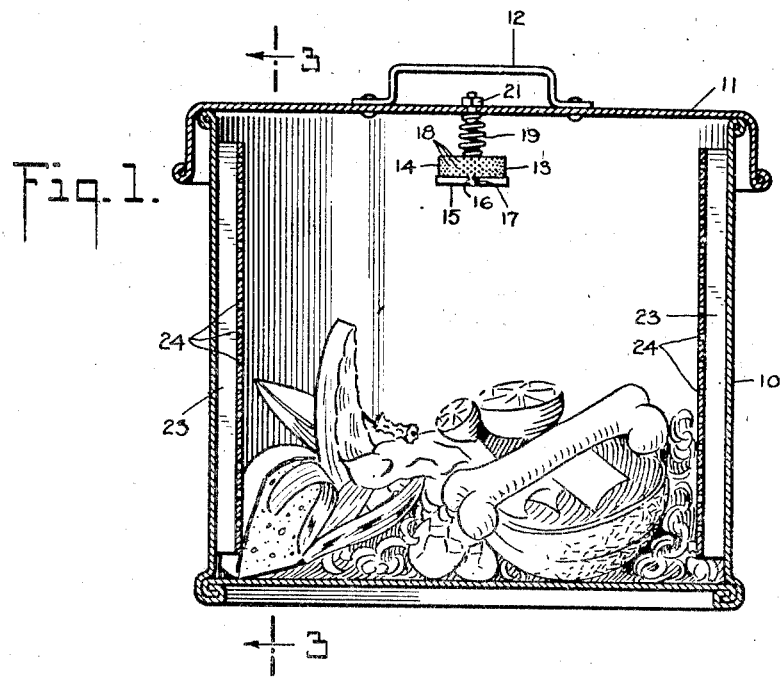
Figure 2:
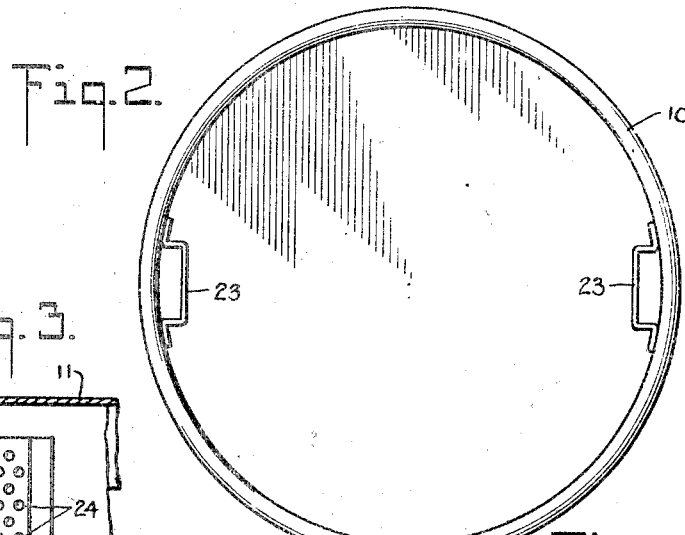
Figure 2 is a plan view of Figure 1 with the cover member removed.
Figure 3:
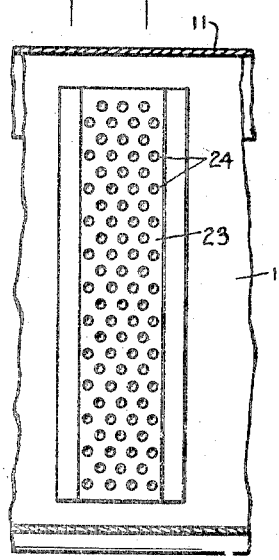
Figure 3 is a section on a line 3—3 of Figure 1.
Figure 4:
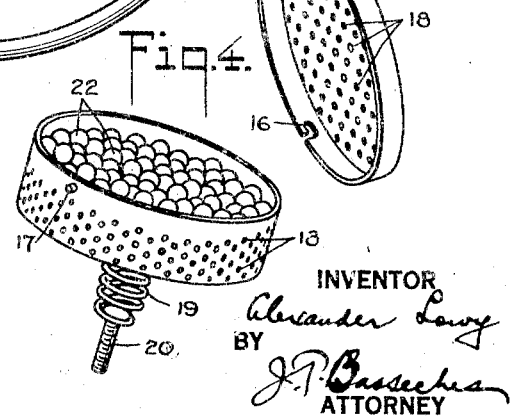
Figure 4 is a perspective view of a detailed view of the container for a disinfectant.

For the practice of my process in its preferred form, I circulate air, preferably laden with water vapor, about and over a deodorant and disinfectant and then utilize the air so saturated with water vapors to perform the deodorizing and disinfecting function. In its preferred form, air, preferably carrying a quantity of water vapor, is made to circulate over a normally solid disinfectant, such as paradischlorbenzene, to more effectively vaporize the disinfectant and become laden therewith. The vapors so treated have particular utility in the treatment of waste products, such as garbage.

I have found that I may very effectively obtain a comparatively thorough dissemination of a deodorant or disinfectant in air, particularly that which carries a certain quantity of water vapor, and still further obtain the water vapor for this purpose from the material which it is desired to treat, to wit: the waste products, such as garbage. Thus I have found that the receptacle containing the material to be treated for deodorizing or disinfecting purposes and in connection with this type of receptacle, such as a garbage can, I include a receptacle for holding the deodorant or disinfectant, such as paradichlorbenzene, the parts being so constructed and arranged as to induce dissemination of the paradichlorbenzene or similar deodorant or disinfectant, preferably by a circulation of the air within the receptacle which is retained to increase the water vapor content and thereby take up a greater quantity of the paradichlorbenzene.

In the illustration 10 is the receptacle proper of the usual garbage can variety, having a cover member 11 provided with a suitable handle 12. Preferably suspended from the cover member 11 I provide a container 13 for a normally solid deodorant or disinfectant, such as paradichlorbenzene. This container comprises a body portion 14 and a cap 15 separately mounted relatively to each other by the bayonet slots 16 and the lugs 17. Suitable perforations 18 are supplied in both the body of the container and the cap.

It will be observed that this container, though preferably made of metal and perforated to permit the ready circulation of air therethrough, for certain purposes may be made of suitable foraminous material such as wire gauze or paraffin paper, paper or combinations of metal and paper. The container 13 may be attached to the cover member in any suitable manner. However, it is preferred to suspend the container in a manner to permit a vibratory action relatively to the garbage receptacle, and for this purpose the container 13 is suspended by a helical spring 19 and attached to the receptacle by the bolt 20 attached to the helical spring and fixedly engaged to the cover by the nut 21. Within the container 13 there is preferably retained a normally solid deodorant or disinfectant which readily vaporizes, particularly when subject to air containing water vapors and for this purpose I use paradichlorbenzene in the form of balls 22. It will be understood, however, that for certain purposes this normally solid disinfectant may be incorporated within the container in granular or crystalline form and the balls such as 22 may be pebbles, shots, marbles, which serve to assist the dissemination of the granular or crystalline material.

For the practice of my process of disseminating vapors of a deodorant or a disinfectant, after the container 13 and its deodorizing and disinfecting material are assembled with the cover member, this cover member 11 holding this container 13 may be merely positioned over the opening of the receptacle 10 and the circulation of air within the receptacle, particularly that laden with water vapors normally accompanying waste products, such as garbage, will serve to saturate the air within the receptacle and thus perform its function of deodorizing and disinfecting. It is preferred, however, to rapidly open and close the receptacle by moving the cover member 11 as by fanning it over the receptacle, giving it a vibratory action. This action will serve to circulate the air and cause it to take up the maximum amount of water vapor and also cause it to pass over the deodorant or disinfectant retained within the receptacle 13, disseminating the vapors thereof.

It will be observed that where I use the spring mounting 19 for the receptacle 13, the vibratory action is enhanced, thus assuring a more thorough circulation and thereby a more thorough dissemination of the deodorizing and disinfecting agent. It will also be observed that where I use the deodorizing or disinfecting material in the form of pulverulent or crystalline material, the vibratory action of the spring 19 or the jiggling action given to the cover member 11, where no spring member is used, will serve to scatter more perfectly some of this material upon the waste material retained within the receptacle.

In order to ensure a still further more perfect circulation of air within the receptacle to thereby have the air take up the maximum amount of water vapor for introducing an increased dissemination of the deodorant or disinfectant, I provide means for still further circulating the air to all of the material retained within the receptacle, as well as causing a ready interchange of water vapor thereof, and for this purpose I dispose a longitudinal vent or duct 23 as many as desired, along the walls of the container 10. This longitudinal vent or duct is preferably perforated so that suitable outlets are provided for ready circulation of the air and the moisture laden air immediately surrounding the garbage or waste products. The duct further facilitates the circulation of air to all portions of the material retained within the receptacle, particularly when vibratory action is given to the cover member 11. The ducts also induce the formation of currents of the air retained therein and to pass over the container 13, retaining the deodorant and disinfectant. In this manner I still further ensure the more thorough dissemination of the disinfectant or deodorant and also ensure the distribution of the maximum amount of a quantity of water vapor within the air so circulated.

In the claims where I specify a normally solid disinfectant as the preferred ingredient I consider it within the scope of this term to cover a liquid disinfectant absorbed in some porous substance or carrier which will not prevent the vaporization or volatization of the disinfectant or deodorant when used in a solid form but which will also, for certain purposes, enhance the volatilization or vaporization of the deodorant or disinfectant as caused by a circulation of air thereover or therethrough, particularly when enriched with a certain quantity of water vapor. Thus I may use halogenated derivatives of aromatic hydrocarbons, such as ortho-dichlorbenzene, in liquid form absorbed in an inert carrier such as saw dust, kieselguhr, pumice and obtain substantially the same effect as paradichlorbenzene, which is normally solid. Thus it is contemplated to use a deodorant or disinfectant which is vaporized by circulation of air thereover or, more preferably, by circulating air laden with water vapor to enhance the carrying capacity of the air for the deodorant or disinfectant.

It will still further be observed that I have devised a novel process for more thoroughly disseminating the vapors of a normally solid disinfectant, such as a halogenated derivative of an aromatic hydrocarbon, preferably paradichlorbenzene, and have provided novel apparatus for accomplishing this method.

Having thus described my invention and illustrated its use, what I claim as new and desire to secure by Letters Patent, is

1. In a garbage or like treating device, including a mass of paradichlorbenzene, means for holding said mass, comprising means to permit circulation of air and vaporization of the paradichlorbenzene, and means to accentuate the distribution of the paradichlorbenzene, comprising a vibratory member for said mass holding means.

2. In a garbage or like treating device, comprising a receptacle, including a mass of paradichlorbenzene, means for disseminating said paradichlorbenzene comprising a vibratory member for the said mass.

3. In a garbage or like treating device adapted to hold moisture laden products, comprising a receptacle and cover member therefor, a container attached to said cover member adapted to hold a normally solid deodorant and disinfectant, comprising paradichlorbenzene, means for inducing dissemination of said deodorant and disinfectant by abrasion of the particles thereof comprising a vibratory suspension for said container.

4. In a garbage or like treating device including a mass of paradichlorbenzene, means for holding said mass comprising means to permit circulation of air thereover to cause vaporization of the paradichlorbenzene and means to accentuate the distribution of the paradichlorbenzene by abrasion of the particles thereof, comprising a vibratory member for said mass holding means.

5. The herein described process for disinfecting and deodorizing garbage and preventing the attraction of flies and the formulation or accumulation of maggots which comprises circulating air and disseminating moisture in contact with a mass of halogenated derivative of aromatic hydrocarbons in a container for the garbage, the mass being disposed for gravitational dissemination of the air and moisture retaining vapors of the halogenated derivative of aromatic hydrocarbons.

6. In a garbage can or like retaining device adapted to hold moisture laden products and form an upward circulating stream of moistened air, a cover member for said device, a foraminous receptacle included by said cover member, having therein paradichlorbenzene and disposed in the path of the ascending moistened air, said receptacle being disposed to gravitationally direct the moistened air and vaporized paradichlorbenzene to the garbage within the can whereby the garbage will be substantially disinfected and deodorized.

7. The process of preventing the development of maggots in garbage cans which consists in exposing a charge of paradichlorbenzene at the top of the can to the moist atmosphere of the can, whereby a downwardly flowing vehicular current of moist air transports the vaporized paradichlorbenzene to the garbage at the bottom of the can.

8. The process of preventing the development of maggots in garbage cans, which consists in exposing a charge of a halogenated derivative of aromatic hydrocarbons at the top of the can to the moist atmosphere of the can, whereby a downwardly flowing vehicular current of moist air transports the vaporized halogenated aromatic hydrocarbons to the garbage at the bottom of the can.

In witness whereof I have hereunto signed my name this 28th day of July, 1926.

ALEXANDER LOWY.